2,548,078

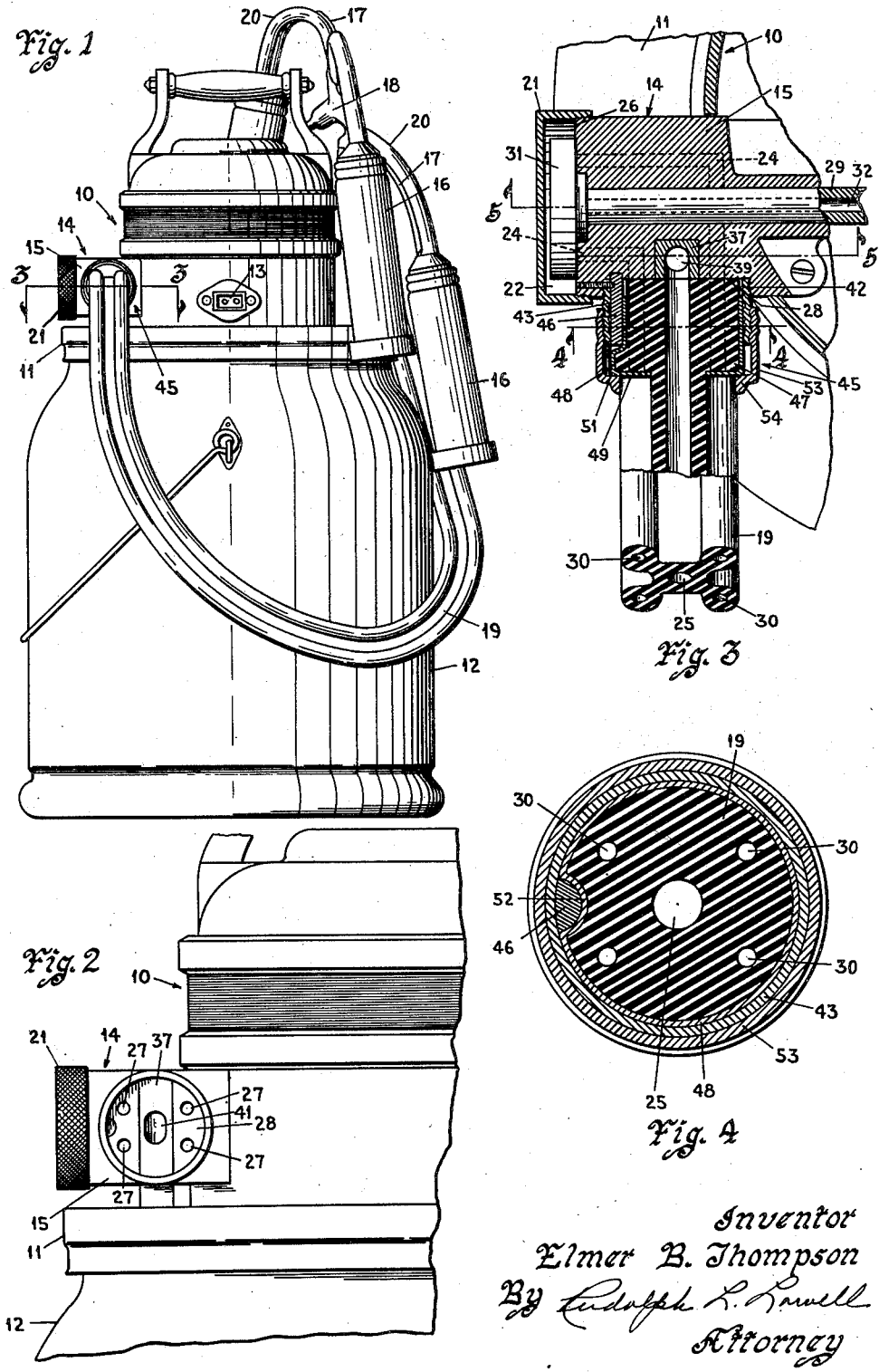
April 10, 1951    E. B. THOMPSON    2,548,078
PIPE COUPLING
Filed Dec. 6, 1945    2 Sheets-Sheet 1
Inventor
Elmer B. Thompson April 10, 1951 E. B. THOMPSON 2,548,078
PIPE COUPLING
Filed Dec. 6, 1945 2 Sheets-Sheet 2
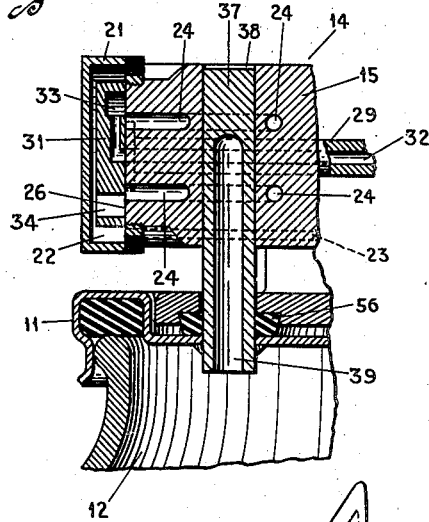
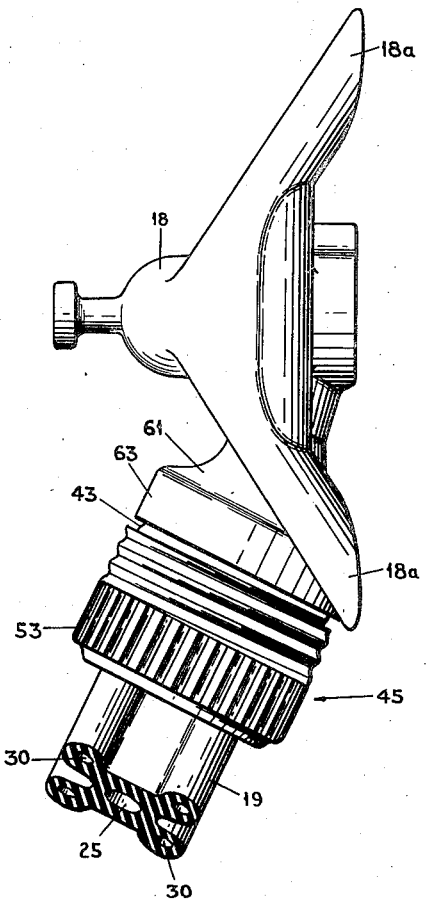
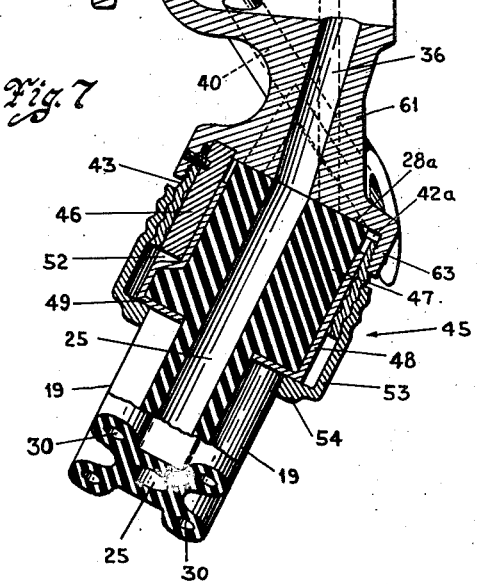
Inventor
Elmer B. Thompson
By Rudolph L. Lowell
Attorney Patented Apr. 10, 1951

UNITED STATES PATENT OFFICE 2,548,078

PIPE COUPLING

Elmer B. Thompson, Des Moines, Iowa, assignor to Globe Milker Incorporated, Des Moines, Iowa, a corporation of Illinois Application December 6, 1945, Serial No. 633,240

2 Claims. (Cl. 285—21)

This invention relates generally to milking machines and in particular to a coupling device for fluid connecting a flexible air and milk carrying conduit with a claw member and an air distributing and milk receiving unit.

An object of this invention is to provide an improved coupling for fluid connecting corresponding air and milk passages formed within separate units of a milking machine.

Another object of this invention is to provide, in a milking machine, a coupling for fluid connecting in proper registration air and milk passages formed in a flexible conduit with corresponding air and milk passages formed in units of said milking machine between which the conduit is connected.

Yet another object of this invention is to provide a coupling device for a milking machine, which is adapted to concurrently fluid connect and align in proper registration a plurality of passages formed in parts of the machine to be connected.

A still further object of this invention is to provide in a milking machine, a coupling device adapted to fluid connect a plurality of passages formed in a unit of the machine with a plurality of corresponding passages formed in a conduit, and having means for positioning the corresponding passages in proper registration with each other, and for positively maintaining such registration.

A feature of this invention is found in the provision of a coupling device in a milking machine for fluid connecting a plurality of passages in a resilient conduit with a plurality of passages formed in a unit of the machine, in which a coupling member fixed on the unit is extended about a surface portion having openings therein defining the ends of fluid passages in the unit. A second coupling member is rotatably mounted about an end portion of the conduit and movable longitudinally in one direction thereon to a stop position. On reception of the conduit one end within the fixed coupling member, the rotatable coupling member is adapted for threaded connection with the fixed coupling member to move and hold the conduit end in a fluid sealed engagement with the surface portion within the fixed coupling member. Co-acting guide means on the conduit and fixed coupling member provide for the fluid passages in the conduit being in registration with corresponding passages in the surface portion of the machine unit.

Yet another feature of this invention is found in the provision of a milking machine having a power unit adapted to be supported on a cover for a milk receptacle, in which a coupling device for fluid connecting an air and milk conduit with air passages formed in the unit and an upright milk passage carried on the receptacle cover, is adapted to concurrently releasably connect the power unit and the upright milk passage whereby the power unit and the cover are movable together relative to the milk receptacle.

Further objects, features and advantages of this invention will become apparent from the following description when taken in connection with the accompanying drawings in which:

Fig. 1 is a side elevational view of a milking machine embodying the coupling device of this invention;

Fig. 2 is an enlarged elevational view of a portion of the power unit of the milking machine illustrated in Fig. 1, showing the assembly, with an air distributing device therein, of a portion of the coupling of this invention;

Fig. 3 is an enlarged sectional view taken on the line 3—3 in Fig. 1;

Fig. 4 is an enlarged sectional view as seen on the line 4—4 in Fig. 3;

Fig. 5 is a sectional view taken on the line 5—5 in Fig. 3;

Fig. 6 is an elevational view of a claw member, illustrated in the machine of Fig. 1, showing the coupling of this invention assembled therewith; and Fig. 7 is an elevational view of the claw member in Fig. 6 with parts shown in section to more clearly illustrate the assembly therewith of the coupling of this invention.

With reference to the drawings the coupling device of this invention is illustrated in Fig. 1 as applied to a milking machine of mechanical type including a power unit, indicated generally as 10, adapted to be mounted on a cover 11 for a milk receptacle 12. The power unit is a package assembly and comprises an electric motor (not shown) adapted for connection with a suitable source of electrical supply through a plug-in connection 13. Located within the unit 10 and operated by the electric motor is a pump (not shown) and a device 14 for distributing air at different pressures to teat cups 16 of inflation type, which are connected through air and milk lines 17 and 20, respectively, with a claw member 18, which in turn is in fluid connection with the air distributing device 14 through a milk and air carrying conduit 19 comprised of a rubber or like material and integrally formed with a milk passage 25 and air passages 30. The conduit 19 is connected with the claw member 18 and the air distributing device 14 by the coupling device of this invention, indicated generally as 45 in Figs. 1, 3, 6 and 7, and which will be hereinafter described in detail.

The air distributing device 14 (Figs. 3 and 5) projects laterally from the lower unit 10 and includes a body member 15 having its outer end of a cylindrical shape adapted for threaded engagement with a cap member 21, with a space 22 between the cap and the body member constituting a chamber which is connected with the pump in the power unit 10, through a suitable air connection including a passageway 23, and maintained by the pump at a sub-atmospheric pressure. Also maintained under sub-atmospheric pressure by the pump is the space within the milk receptacle 12.

Formed within the air distributing device 14 are four air passages 24, one for each teat cup 16, which passages terminate at one of their ends in openings arranged in a spaced relation in the end face 26 of the body member 15, which end face forms a sidewall for the air chamber 22 and functions as a valve seat as will appear later. The opposite ends of the air passages 24 terminate in openings 27 formed in a surface portion 28 (Figs. 2 and 3) of the body member 15.

Air passages 24 are alternately opened in succession to the sub-atmospheric air chamber 22, and to an atmospheric air chamber (not shown) in the power unit 10, by means including a rotary valve having a stem 29 rotatably supported in the body member 15 and connected in a driven relation with the electric motor in the power unit 10 (Figs. 3 and 5). A valve head 31 on the stem 29 is located in the chamber 22 and has one side in seating engagement with the valve seat 26.

Extended axially of the stem 29 is an air passage 32 connected at one end with the atmospheric chamber in the power unit 10, and having its opposite end connected with an annular groove 33 formed in the side of the valve head 31 adjacent to the valve seat and adapted to be passed over the ends of the passages 24 located in the valve seat 26. An annular recess 34 extends through the valve head 31 to fluid communicate the passages 24 in succession with the air chamber 22 as the valve member is rotated. The air distributing device 14 and power unit 10 are described in detail in Patent No. 2,427,312.

In the operation of the milking machine the groove 33 and the recess 34 are passed in succession over the end openings of the passages 24 in the valve seat 26, to alternately distribute air at sub-atmospheric and atmospheric pressures to the passages 24 and in turn to the teat cups 16, through the conduit 19, claw member 18 and air lines 17.

Milk from a teat cup 16 is carried through a milk line 20 and through a milk passage 40 in a claw 18a to a common milk passage 36 in the claw member 18 (Figs. 1 and 7). The milk in the passage 36 then travels through the milk passage 25 in the conduit 19 to a nipple or milk passage unit 37, in the air distributing device 14 which is open to the space within the milk receptacle 12 (Figs. 3 and 5).

The nipple 37 extends through and is secured to the receptacle cover 11 in an upright position. When the power unit 10 is supported on the cover 11, the nipple 37 is loosely received in a cavity 38, formed in the body member 15 and open to the surface portion 28, so that the nipple 37 is flush with the surface 28. The upper end of the milk passage 39, in the nipple 37, terminates in an opening 41 located in the plane of the surface 28 and intermediate the openings 27 for the milk passages 24. It is seen, therefore, that the air passages 24 and the milk passage 39 terminate in openings 27 and 41, respectively, located in a common surface 28 of the body member 15.

In milking machines of mechanical or pulsator type it is common practice to individually connect air lines and a milk line with a claw member and with a pulsator or like means. This is generally objectionable because of the inconvenience, time consumed in making the connections, and difficulties in properly connecting the air lines and the milk line with corresponding air and milk passages in the claw member and the pulsator. These difficulties are entirely eliminated by the coupling device 45 of this invention which will now be fully described.

As shown in Fig. 3 the surface portion 28 of the body member 15 constitutes the bottom wall of a recess 42 formed in the member 15 and having its sidewall internally threaded. Threadable within the recess 42 to a fixed position is a coupling member 43 of a tubular shape, having its free end externally threaded, and projected outwardly from the body member 15 so as to constitute an extension for the sidewall of the recess 42. Extended axially of the fixed coupling member 43 and projected inwardly from its inner periphery is a guide or pin member 46.

The end of the conduit 19, to be connected with the air distributing device 14, is formed with an enlarged section 47 adapted to be loosely received within the fixed coupling member 43. Mounted in a fixed position about the conduit and section 47 is a tubular sleeve member 48 having one end spaced from the end of the conduit 19, and an opposite end provided with an inwardly extended annular flange 49 to form an annular shoulder 51 extended about the conduit 19. An axially extended depression 52, in the periphery of the sleeve member 48, is of a size to guidably receive the guide member 46 on the fixed coupling member 43 for a purpose which will appear later.

Loosely positioned in a spaced relation about the sleeve member 48 is a rotatable or movable coupling member 53, of a tubular construction, having an inwardly extended annular flange 54 at its inner end constituting a shoulder adapted for bearing engagement with the shoulder 51 on the sleeve member 48 to limit the movement of the movable coupling member 53 in one direction axially of the sleeve member 48. The outer end of the movable coupling member 53 is externally threaded for threadable engagement with the external threads on the projected end of the fixed coupling member 43.

From a consideration of Fig. 3 it is seen that the outer end of the sleeve member 48 is spaced inwardly from the end face of the conduit section 47 and that the movable coupling member 53, when the stop shoulders 51 and 54 are in their engaged positions, has its outer end terminating substantially at the outer end of the sleeve member 48. As a result the end face of the conduit section is spaced outwardly from the outer ends of the sleeve member 48 and the coupling member 53 for a purpose which will appear later.

In the use of the coupling device 45 the axial depression 52 in the sleeve member 48 is initially aligned with the pin 46 on the fixed coupling member 43 and the conduit end section 47 is then inserted within the fixed coupling member 43. The alignment of the pin 46 within the depression 52 provides for the milk passage 25 and air passages 30 in the conduit 19 being in proper registration with the corresponding milk opening 41 and air openings 27 in the surface portion 28, with the pin 46 and the depression 52 constituting a cooperative guide means for accomplishing this registration.

With the conduit end section 47 positioned within the fixed coupling member 43, the movable coupling member 53 is in a position for threaded engagement with the fixed coupling member. As the coupling members 43 and 53 are coupled together, by rotation of the coupling member 53, the shoulder 54 is moved into bearing engagement with the shoulder 51 whereby the end face of the conduit section 47 is pressed or clamped in a fluid sealed engagement against the surface portion 28. By virtue of the conduit 19 being formed of a resilient material, such as rubber, and the extension of the conduit end section 47 outwardly from the sleeve member 48, the end face of the conduit section 47 is permitted to spread over the surface portion 28 so as to function as a fluid sealing gasket.

Thus by initially aligning the co-acting guide means 46 and 52 and then threadably coupling the movable coupling member 53 with the fixed coupling member 43, corresponding air and milk passages in the conduit 19 and in the air distributing device 14 are assured of a proper registration, concurrently with the movement of the conduit 19 into a fluid sealed engagement with the surface portion 28. It is to be understood, of course, that the spaced arrangement of the passages 25 and 30 in the conduit 19 is the same as the spaced arrangement of the openings 27 and 41 in the surface portion 28.

As previously mentioned the nipple unit 37 is loosely received in the cavity 38 formed in the body member 15 at the surface portion 28, so that the power unit 10 is separable from the receptacle cover 11. However, on completion of the connection of the conduit 19 with the air distributing device 14, the nipple unit 37 is clamped between the end face of the conduit section 47 and the bottom wall of the cavity 38. Due to this clamping action the nipple unit 37 is frictionally held within the air distributing device whereby the cover 11 is attached to the power unit 10 for movement therewith relative to the milk receptacle 12.

On release of the coupling device 45 the nipple unit 37 is concurrently released from its clamped position between the conduit 19 and the air distributing device 14 whereby the cover 11 and the power unit 10 are separable for cleaning or servicing purposes. The assembly of the nipple unit 37 relative to the air distributing device 14 and the coupling 45 thus provides a means for releasably locking the power unit 10 with the cover 11 for movement together.

As shown in Fig. 5 a gasket 56 of a rubber material, is secured to the under side of the power unit 10 and is provided with an opening for receiving the lower end of the nipple unit 37. The gasket 56 is of a ring shape and is interposed between the power unit 10 and the cover 11, for sealing purposes, when the power unit is supported on the cover. Since the gasket 56 may undergo variations in thickness due to wear or conditions of use, the opening 41 in the nipple unit (Fig. 2) is of an elongated shape to accommodate such variations and to assure at all times a proper registration of the opening 41 with the milk passage 25 in the conduit 19.

With reference to Figs. 6 and 7 the coupling device 45 of this invention is shown in assembly relation with the claw member 18. The milk passages 40 in the claw member terminate in the common milk passage 36 which is located in a boss member or projection 61 of the claw member. Likewise all of the air passages 62 in the claw member 18, which passages 62 are connected at one of their ends with the air lines 17 for the teat cups 16, extend into the projection 61. The other ends of the passages 62 and one end of the common milk passage 36 terminate as openings in a surface portion 28a of the projection 61, which surface 28a is defined by an upstanding annular rim 63. The rim 63 and the surface 28a thus define an annular cavity or recess 42a in the projection 61.

The coupling device 45 is assembled with the sidewall 63 of the cavity 42a in all respects similar to its assembly with the sidewall of the recess 42 in Fig. 3, so that a further description of its assembly and use with the claw member 18 is believed to be unnecessary. Like numerals of reference are used in Figs. 3, 4, 6 and 7 to designate like parts.

From a consideration of the above description it is seen that the invention provides a coupling device for a milking machine which is adapted to easily and quickly connect an air and milk carrying conduit through a single coupling connection, with the corresponding air and milk passages in a unit of the machine. The coupling device is provided with co-acting guide means to accomplish a proper registration of the air and milk passages in the conduit with the air and milk passages in the unit, with which the conduit is to be connected, concurrently with the making of the connection. Loss of time and inconvenience in making the connection and in having the various air and milk passages in proper registration are thus entirely eliminated.

Although the invention has been described and illustrated with respect to a preferred embodiment thereof it is to be understood that it is not to be so limited since changes and modifications can be made therein which are within the full intended scope of this invention as defined by the appended claims.

I claim:

1. In milking machine apparatus including a flexible conduit having air passages and a milk passage formed therein, and a unit having corresponding air passages and a milk passage formed therein and terminating at one of their ends as openings in a surface portion of said unit, the means for fluid connecting the passages in said conduit with the passages in said unit including an annular upright wall extended about said surface portion and adapted to receive one end of said conduit therein, a sleeve member mounted on said conduit in a fixed position spaced from the end face at said one conduit end, a tubular coupling member supported about said sleeve member for rotational and longitudinal movement relative to said sleeve member, coacting portions on said sleeve member and on said coupling member for limiting the longitudinal movement of said coupling member in one direction relative to said sleeve member, means for locating the passages in said conduit in registration with corresponding passages in said surface portion, when said one conduit end is positioned within said wall, includng a radial projection on the inner periphery of said wall, with said sleeve member having an axially extended recess therein adapted to receive said projection, said coupling member and said wall being adapted for a threaded connection to move and hold the end face at said one conduit end in a fluid sealed engagement with said surface portion.

2. A milking apparatus including a flexible conduit member having air passages and a milk passage formed therein, and a body member having corresponding air passages and a milk passage formed therein and terminating at one of their ends as openings in a surface portion of said body member, the means for fluid connecting the passages in said conduit member with the corresponding passages in said body member including a coupling movably supported at one end of said conduit member for rotational movement and limited longitudinal movement, co-acting means on said body member and on said coupling for releasably connecting said coupling with said body member such that the end face at said conduit member one end is held against said surface portion, and means for registering the passages in said conduit member with the openings in said surface portion including co-acting portions on said two members adapted to be releasably engaged, on positioning of said conduit member one end opposite said surface portion, to hold said conduit member against rotational movement relative to said body member, said coupling, on connection with said body member, acting to move and hold the end face at said one end of the conduit member in a fluid sealed engagement with said surface portion.

ELMER B. THOMPSON.

REFERENCES CITED

The following references are of record in the file of this patent:

UNITED STATES PATENTS

| Number | Name | Date |
|---|---|---|
| 626,447 | Strater | June 6, 1899 |
| 1,097,263 | Reich | May 19, 1914 |
| 1,304,197 | Nyquist | May 20, 1919 |
| 1,953,701 | Clark | Apr. 3, 1934 |
| 2,340,454 | Conde | Feb. 1, 1944 |
| 2,427,312 | Thompson et al. | Sept. 9, 1947 |

FOREIGN PATENTS

| Number | Country | Date |
|---|---|---|
| 17,922 | Great Britain | Oct. 9, 1900 |
| 330,182 | Italy | Oct. 7, 1935 |